2,877,177
TREATMENT OF SULFUR DYE WASTE LIQUORS

Joseph B. Story, Baton Rouge, La.

No Drawing. Application June 18, 1953
Serial No. 362,657

1 Claim. (Cl. 210—49)

This invention relates to the treatment of waste liquors containing alkali sulfides and more particularly to the treatment of sulfur dye wastes.

The manufacture and use of sulfur dyes results in the formation of a toxic and highly alkaline waste liquor which cannot be disposed of in a conventional manner since it unduly pollutes and stagnates fresh water rivers and streams. These waste liquors are highly colored and odoriferous. The sodium sulfide or other alkali sulfides contained therein hydrolyzes with water and forms hydrogen sulfide which is toxic to marine life and has a foul, disagreeable odor. No wholly suitable means for the treatment or disposal for these liquors is known at the present time. Neutralization treatments of these alkaline liquors, such as with sulphuric acid, result in the formation of a highly turbid suspension and the evolution of large quantities of hydrogen sulfide gas. Such acid treatments do not suitably improve the color of these waste liquors.

It is accordingly an object of this invention to provide a process for the treatment of waste liquors of sulfur dye wastes. Another object is to provide a treatment of liquors of the above type which will decolorize, deodorize, neutralize and otherwise purify these waste liquors without the evolution of material quantities of hydrogen sulfide. Another object of the invention is to provide a process in which the purified liquor can be disposed of without coloring a stream or river or without detrimental effect on either the appearance of the water or endangering marine life therein. Other objects and advantages of this invention will be apparent from the following description and claim.

It has now been found that sulfur dye waste liquors can be deodorized, decolorized, neutralized and otherwise purified by treatment with an aqueous sulfurous acid solution or other sulfur dioxide-containing compounds. However, it is necessary that the liquor be mixed with the sulfurous acid within a limited time, and that the ratio of liquor to acid or the initial pH be controlled within relatively close limits. Surprisingly, under such conditions, the sulfurous acid reacts with the toxic, color and odor producing components of the waste liquor, coagulating the undesired components thereof and forming a stabilized clear solution phase. The coagulated fraction can then be removed from the clear solution by filtration, decantation, centrifugation or any other separation technique and the solution disposed of in a river or other waterway without danger of pollution or stagnation of the water.

As noted above, both the time of mixing and the relative concentration of the liquor and sulfurous acid are critical. In fact, when the solutions are mixed slowly, over a period of greater than five minutes for example, no improvement in color results. This is true even when using relatively high concentrations of sulfurous acid. Likewise, if an insufficient quantity or an excess quantity of sulfurous acid is employed, even with rapid mixing, the liquor retains considerable color, although its toxicity may be reduced or eliminated.

The molar ratio of sulfurous acid to alkali sulfide should be between the range of 0.5:1 and 4.5:1. Lower concentrations of sulfurous acid do not completely purify or deodorize the waste liquor, although some improvement of the pollution characteristics is noticeably at lower concentrations. Higher concentrations of sulfurous acid, while considerably improving the pollution characteristics of waste liquors, produce colored solutions instead of the clear solutions obtained while carrying out the process within the operative range of concentrations discussed above. The preferred molar ratio of sulfurous acid to alkali sulfide is between 1.1:1 and 1.7:1.

As noted above, the separation technique can be carried out with any of the known separation techniques. On large scale operations, it is normally preferred to employ a sedimentation technique. The sedimentation rate of liquor treated in accordance with this invention is depended somewhat upon the molar ratio of sulfurous acid to alkali sulfide and this rate has been found to be a maximum within the preferred range noted above, i. e. the molar ratio of sulfurous acid to alkali sulfide between 1.1:1 and 1.7:1.

The rate of addition of the sulfurous acid to the waste liquor is relatively critical. Very rapid mixing is desired since if the acid is added slowly to the liquor, the color of the liquor is not materially improved. However, in the latter case the polluting characteristics of the liquor is improved. The above is particularly surprising since when the same quantities of the sulfurous acid is added to a waste liquor at a relatively rapid rate and at a slow rate, the color is materially improved or completely eliminated with rapid mixing, whereas, with slow addition, no particular improvement in the color of the solution is obtained.

It is normally preferred to control the ratio of sulfurous acid to waste liquor by the pH of the treated solution. Normally, after the addition and mixing of the acid, the pH continues to drop for a period of from about 10–200 minutes to a minimum value and thereafter the pH rises to some final value. The initial pH, immediately after mixing, should be normally above about 6 and not more than about 7.5. It is desirable that the initial pH (immediate) should be between about 6.4 and 7.0 and preferably between 6.7 and 6.9. In general, the more dilute the waste liquor solution, the lower the initial pH desired.

The mixing operation should be carried out in a period of less than five minutes. Generally, however, it is desired to effect complete mixing in less than one minute, the shortest possible period giving best results. Normally, it is preferred to mix the liquor and sulfurous acid in less than ten seconds.

It is desired with most sulfur dye wastes to use only sulfurous acid as the neutralizing medium. However, in some cases it is desired to also employ another acid, such as sulfuric acid. In general, however, the sulfuric acid concentration should not exceed ½ mole per mole of sulfurous acid. When an auxiliary acid is used, it should be added to the liquor prior to the sulfurous acid since the mixed acid tends to increase the evolution of hydrogen sulfide gas.

The temperature of the sulfur dye waste liquor treatment of this invention is not critical. Normally, the treatment is conducted between room temperature and the boiling point of the solution. The initial pH desired will vary slightly with variations in the temperature, the dye bath concentration, and the degree of oxidation of the sodium sulfide and product thereof in the bath.

The following examples illustrate the present process. Examples I and III illustrate the present process in which the initial pH of the treated liquor was above 6.4. These examples are to be compared with Examples II in which insufficient sulfurous acid was used, and with Example IV in which excessive quantities of sulfurous acid, both of which resulted in highly colored waste liquors. Examples I and III are also to be compared with Example V which illustrates addition and mixing of the sulfurous acid with the liquor. It is to be noted that even when equal sulfurous acid is employed, the color of the liquor is not materially improved.

*Example I*

A volume of sulfur black dye waste liquor (T-1636 Sulfogene carbon HCF grains) containing sodium sulfide (1000 parts by weight of liquor) having a foul odor and a pH greater than 11 was treated at room temperature with sulfurous acid to coagulate the dye constituents thereof and to eliminate the stagnating and polluting contents of the liquor. The liquor contained about 2 parts of sodium sulfide. In the treatment, the acid was poured into the waste liquor, and mixed thoroughly within five seconds. A sufficient amount of sulfurous acid (65 parts by weight of 0.5 molar solution) was required to give a 6.8 pH for the treated liquor, immediately following the mixing. Particles immediately appeared in the mixture. The so-treated liquor was then allowed to settle, leaving a clear, colorless, odorless and essentially neutral supernatant liquid and a black, curdy precipitate. Upon separation in a filter, the supernatant liquid was disposed of in a conventional sewerage system. The precipitate is thereafter redissolved with sodium sulfide solution and reused for further dyeing operations.

*Example II*

Example I was repeated except that only sufficient sulfurous acid was added to give an initial pH of 7, immediately following the mixing. In this case, although most of the dye was removed upon settling, the supernatant liquid was turbid and had an intense blue color. Additional sulfurous acid was added to the colored supernatant liquid after several hours to lower its pH to 6.7 without removing the color bodies.

*Example III*

Example I was repeated except that sufficient sulfurous acid was added to give an immediate pH of 6.6. The dye was coagulated and the supernatant liquid had a blue tint. Although suitable for disposal, the liquid was not as satisfactory as that of Example I.

*Example IV*

Example I was repeated except that the pH was lowered to an initial pH of 6.0, 6.1, 6.2, and 6.3 in separate samples. In each case, the supernatant liquid, after separation from the coagulated dye, was yellow and later turned dark blue upon oxidation. Although this liquid was an improvement over the original liquor with respect to its toxicity, the treated liquor was highly colored and acid.

*Example V*

Example I was repeated except that the sulfurous acid was added to the sulfur black dye liquor and mixed over a period in excess of five (5) minutes. The resulting solution was a dark green color and retained its original odor. There was very little coagulation of the dye following the acid addition.

*Example VI*

The treatment of sulfur black dye waste liquor similar to that of Example I is treated continuously with sulfurous acid to coagulate its dye contents, and deodorize, decolorize, neutralize and make the same otherwise suitable for disposal or further use. In this example, the waste liquor is continuously fed with a controlled feed of sulfurous acid into a common pipe. The feed of sulfurous acid is controlled to maintain the pH of the resulting mixture, immediately after mixing at between 6.7 and 6.8. The latter is measured by a glass electrode. Under these conditions, 65 parts by weight/minute of a 0.5 molar sulfurous acid solution is mixed with 1000 parts by weight/minute of the waste liquor. The resulting mixture thereafter passes into a sedimentation vessel. The supernatant liquor is removed therefrom as a clear, odorless, colorless, neutral liquid. It is then used in further processing as a sodium thiosulfate solution, i. e., 0.025 molar.

The above examples were repeated using waste liquors from various other sulfur dyes with similar results. The dye liquors treated includes National Sulfur Brown 2G (Color Index No. 949), Sulfogen Brown (Du Pont), Sulfogen Bordeaux Brown (Du Pont), Sulphogen Yellow D (Du Pont, Color Index No. 948), Pyrogen Pure Blue 2RL (Color Index No. 961) and Sulfogen Navy Blue (Du Pont).

I claim:

A process of treating sulfur dye waste liquors containing alkali metal sulfides which are highly colored and odoriferous without appreciable formation of hydrogen sulfide comprising mixing within one minute said liquors with an acid solution consisting essentially of sulfurous acid in a molar ratio of sulfurous acid to alkali metal sulfide of from about 1.1:1 to about 1.7:1, said mixture having an immediate pH of between about 6.7 and 6.9 to form a coagulate phase and a colorless and odorless liquid phase, and thereafter separating said phases.

References Cited in the file of this patent

UNITED STATES PATENTS

| | | |
|---|---|---|
| 1,242,676 | Forsyth | Oct. 9, 1917 |
| 1,276,644 | Goldschmidt | Aug. 20, 1918 |
| 1,834,845 | Jones | Dec. 1, 1931 |

FOREIGN PATENTS

| | | |
|---|---|---|
| 860 | Great Britain | of 1877 |
| 1,612 | Great Britain | of 1873 |
| 11,317 | Great Britain | of 1904 |
| 632,076 | Great Britain | Nov. 16, 1949 |

OTHER REFERENCES

Rudolfs: "Industrial Wastes," New York: Reinhold, 1953, p. 444 (quotation from article appearing in 1950).

Kendall: Smith's Inorganic Chemistry, The Century Co., New York, N. Y., 1926, pages 477-478.